Dec. 9, 1930.    G. W. HEISE ET AL    1,784,592
DRY BATTERY ELECTROLYTE REENFORCING MEANS
Filed May 28, 1928
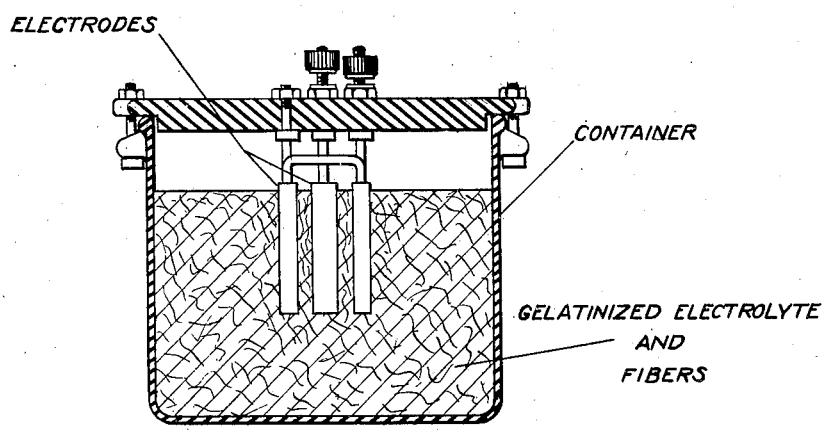
George W. Heise,
Erwin A. Schumacher,
INVENTORS,
BY
ATTORNEYS.

Patented Dec. 9, 1930

1,784,592

UNITED STATES PATENT OFFICE

GEORGE W. HEISE AND ERWIN A. SCHUMACHER, OF LAKEWOOD, OHIO, ASSIGNORS TO NATIONAL CARBON CO., INC., A CORPORATION OF NEW YORK

DRY BATTERY ELECTROLYTE REENFORCING MEANS

Application filed May 28, 1928. Serial No. 281,287.

Our invention relates to electric cells, and particularly to a new type of gelatinous electrolyte composition therein. One of the principal objects of our invention is to provide an electrolyte composition of the gelatinous type, adapted to utilization in portable cells, which provides increased strength, and resistance to injury, in the gel electrolyte as well as other advantageous features.

In the construction of electric cells, it has been found convenient to provide a gelatinous electrolyte, in order to avoid the danger of spillage of the dissolved reactive substance therein. We find that in the construction of such a cell, it is possible to produce a gelatinous electrolyte having greatly improved durability, resistance to impact and similar mischances which tend to injure the cell, as well as leakage of fluid because of syneresis, by the provision of reenforcing means in the gel, whereby an increase in strength and durability of the cell is obtained.

Other objects and details of our invention will be apparent from the following description when read in connection with the accompanying drawing; wherein The single figure is a diagrammatic representation of a cell embodying the device of our invention.

Our invention is particularly adapted to the primary cell of a type utilizing a zinc anode, caustic alkali electrolyte and copper cathode with copper oxide depolarizer in which the electrolyte is gelatinized. In practicing our invention, we provide the usual cell elements, which may take any convenient form, within a suitable container. We further provide a suitable electrolyte of the gelatinous type which may be conveniently produced by the use of a gelatinous substance such as starch or a cereal in the caustic soda solution. In the electrolyte gel we further include a quantity of fibrous material such as glass wool, asbestos or excelsior. The inclusion of the fibrous material greatly increases the mechanical strength and durability of the gel and in consequence greatly reduces the danger of liquefaction and syneresis, and likewise greatly increases the resistance of the gel to disruption by shock or impact. It appears that the mass of fibres form a reenforcing structural framework, which provides the desired additional strength.

While we find that either the glass wool or the asbestos is suitable, and advantageous, for the production of the desired increase in strength, the excelsior, above-mentioned, has the same and also other favorable features. We find that this use of excelsior, which being a woody material, yields extractives to the electrolyte, produces a valuable increase in the efficiency of the cell. The excelsior thus serves a double function, that of strengthening the electrolyte gel, and that of providing the desired extractives for increasing the efficiency of the cell.

Our invention is particularly advantageous when applied to the type of cell in which an alkaline electrolyte is used. It is however, applicable in a similar way to other types of cells having gelatinized electrolytes, and when so applied may produce similar improvements therein.

The construction of our invention is not only applicable to the particular type of cell above described, but is also applicable to other types of cells. For instance, certain cells, either primary or secondary, may utilize an acid electrolyte, gelatinized with a silica gel. A similar gain in strength and durability is obtainable in cells of this type by the inclusion therein of a suitable fibrous reenforcing material. The glass wool previously mentioned is particularly suitable, although satisfactory results are obtainable from the asbestos and from the excelsior or from other fibrous materials.

In the cells utilizing a salt electrolyte, such as ammonium chloride, valuable improvements may be obtained by a similar use of a fibrous reenforcing material, in which case various other fibrous materials are useable, the principal requirement being reasonable resistance to injury by the electrolyte substances.

Certain types of cells contain electrolyte, gelatinized by the use of agar-agar, or gelatin, in which cells likewise gains in strength and durability are obtainable by the inclusion of suitable reenforcing fibers.

Broadly, the construction of our invention is applicable to stiffened electrolytes of any type by the inclusion therein of any suitable reenforcing material.

By the device of our invention we have thus obtained a substantial increase in the strength and durability of gelatinous electrolyte, by means of which the durability of a cell so constructed is greatly increased, and by means of which a cell is provided which is much more satisfactorily portable because of its improved resistance to mechanical shock and injury.

While we have shown but a single embodiment of our device it is capable of still other modifications therefrom without departing from the spirit thereof and it is desired therefore that only such limitations shall be imposed upon the appended claims as are indicated therein or required by the prior art.

We claim as our invention:

1. In a cell, a zinc anode, a copper cathode, a copper oxide depolarizer cooperating with the cathode, a caustic alkali electrolyte incorporated in a gel cooperating with the anode and cathode, and cellulosic reenforcing fibers dispersed in the body of the gel.

2. In a cell, a zinc anode, a copper cathode, a copper oxide depolarizer cooperating with the cathode, a caustic alkali electrolyte incorporated in a gel cooperating with the anode and cathode, and cellulosic reenforcing fibers comprising excelsior dispersed in the body of the gel.

In testimony whereof, we affix our signatures.

GEORGE W. HEISE.
ERWIN A. SCHUMACHER.